Aug. 18, 1959   E. C. VOLLMER   2,899,720
GASKET
Filed Aug. 6, 1957

INVENTOR.
EARL C. VOLLMER
BY J. W. Douglas
his atty

United States Patent Office 2,899,720
Patented Aug. 18, 1959

2,899,720

GASKET

Earl C. Vollmer, Rock Island, Ill., assignor to Midwest Mfg. Company, Galesburg, Ill. a corporation of Illinois Application August 6, 1957, Serial No. 676,690

6 Claims. (Cl. 20—69)

This invention relates to refrigerator seal constructions and more particularly to a refrigerator door gasket construction.

As is well known to those versed in the art, it is essential that a deformable gasket be placed between the refrigerator door and the edge of the cabinet defining the door opening. Preferably this gasket should be made of a deformable material which is easily deformable since the pressure per inch multiplied by the number of inches of gasket determines the amount of pressure required by the door latch to maintain the door sealed against leaks.

It is common practice to use a gasket which contemplates a hollow body and which is secured to the internal flange of the door lining where it meets with the metal of the door. The body usually carries a projection preferably in the form of a hollow bead which may be more pliable than the body itself, and, which constitutes the cabinet engaging portion.

One of the problems with such gaskets arises at the corners. Such a gasket in order to curve to conform to the corner door of the cabinet is prone to produce wrinkles or bulges which interfere with the efficiency of its operation. The gasket can be provided with a miter joint at this point but this leaves the edges without support unless they are cemented and this takes time and skill to make. By the present invention I have provided a corner support which may be utilized in connection with the gasket, all the above described curved portions of the gasket may be cut away and the supports substituted therefor at these places, without interfering with the efficiency of the seal.

Still other advantages of the invention and the invention itself will become more apparent from the following description of an embodiment thereof which is illustrated by the accompanying drawings and forms a part of this specification.

Figure 1:
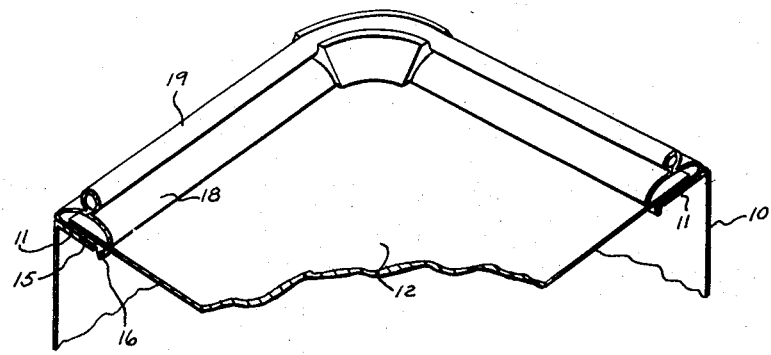
Fig. 1 is a fragmentary perspective view of the corner of a door and the inner door panel with a gasket and corner support of my invention attached thereto.

Referring now to the drawings, throughout which like parts are designated by like reference characters and more particularly to Fig. 1 there is illustrated the outer door shell 10 which may be of conventional construction and is provided with an internal peripheral flange 11. The inner panel or liner 12 may be secured to the door flange 11 in any conventional manner.

In this instance I have shown a gasket, which as will be understood, is co-extensive with the periphery of the door and comprises a base flange 15 juxtaposed to the flange 11, the inner edge of which is provided with a foot 16 that assists in positioning the base on the door flange 11. At the outer edge the flange 15 has an upwardly curved portion which extends over the panel 12 to provide a hollow body 18.

Secured to the body 18 is a bead 19, preferably integral therewith and which may be of substantially circular formation. It will be appreciated that the bead can be formed other than that shown. For instance, the base and bead may be such as is shown in the Morton Patent 2,636,228, of April 28, 1953.

Figure 2:
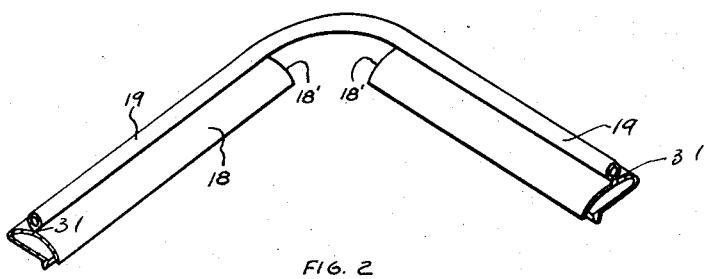
Fig. 2 is a fragmentary perspective view of the gasket prior to attachment to the door.
Figure 3:
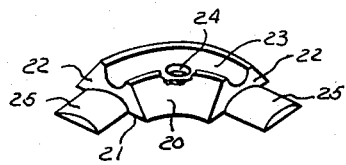
Fig. 3 is a perspective view of the corner support.

As previously explained, heretofore these gaskets had been bent at the corner which caused the inner portion of the gasket to be bulged and the door part to be stretched, providing an inferior seal at the corner. With the advent of refrigerators of modern design having sharper corners, this condition was accentuated. Therefore, with a gasket of the character disclosed, I cut away the body 18 in that portion where it curved to extend around the corner as best shown in Fig. 2, leaving the bead 19, which being smaller, can be more readily bent to the sharper corner without material distortion. This leaves a gap between the free ends 18' of the gasket body adjacent the corners.

The support of my invention comprises a body 20 having a base 21 with upwardly extending tapered sides of arcuate formation. This base may curve for a full 90°, although should the corner be less or more than 90°, the shape and length of the body would be such as to conform thereto. The ends of the body are perpendicular at 22, arranged to meet and engage with the ends 18' of the gasket body. The upper surface of the body is formed with an arcuate seat 23, which in this instance is semi-circular in cross section to conform to the shape of the underside of the bead. The corner piece can be secured to the refrigerator door by a screw which extends through an opening 24 in the corner piece and is threaded into the panel 12, the flange 11, or both, at the corner. Extending outwardly of the ends 22 of the body and of the support are projections 25 which are formed to substantially fill the opening in the hollow gasket body 18. These projections extend into the hollow of the body for a short distance thus maintaining the body in position providing a support for the body and providing a seal between ends 18'. The bead 19 seats in the seat 23.

Preferably the support is made of a soft resilient compressible material, the character of which is such as to provide a support for the bead, and still allow compression or distortion of the body as well as the support itself, when the door is closed.

It will thus be seen that I have provided a support for the corner of a gasket which greatly facilitates the installation of the gasket at the corners. It eliminates the undesirable effects of the bending of the gasket and does not interfere with the continuity of the bead which affects the seal. It is economical to construct and easy to install. Therefore it provides a decrease in the cost of installation, increases the life of the gasket after installation, and provides a more efficient seal when installed.

Figure 4:
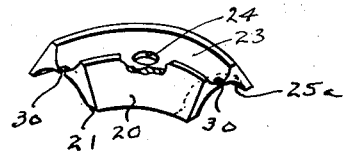
Fig. 4 is a perspective view of another form of corner support.

In Fig. 4 I have shown a modification of the corner support wherein the tongues 25 have been eliminated and in place thereof the body is recessed at 25a so that the body 18 may extend therein for a short distance. A notch 30 is provided to receive the neck 31 which connects the bead 19 to the body.

Having thus described my invention in an embodiment thereof, I am aware that numerous and extensive departures may be made therefrom without departing from the invention as defined in the appended claims.

I claim:

1. A corner support for a refrigerator door gasket wherein the gasket is formed with a hollow deformable hollow base of a resilient material arranged to be secured to a refrigerator door and wherein a distortable bead is carried by the base and is disposed outwardly therefrom for sealing engagement with a cabinet, said support comprising a body member of resilient compressible material formed in an arc of 90° and arranged to be inserted in a space where the base of the gasket is cut away with the ends of said body member meeting with the extremities of the base of the gasket at said cutaway portion and the bead of the gasket extending across the outer side of said body member, said body member at its outer side having an arcuate outwardly facing recess therein for receiving and supporting the bead of the gasket at said cutaway portion of the gasket with the bead extending outwardly beyond the confines of said body member.

2. A device as described in claim 1 wherein said body member is provided with extensions at each end arranged to be extended into and support the hollow body of the gasket.

3. A device as described in claim 1, wherein the body member of the support is provided with an end recess for receiving the body of the gasket.

4. A device as described in claim 1, wherein the arcuate recess in said body member is formed with a notch to receive the portion of the gasket between the bead and the body.

5. In combination, an elongated gasket comprising a base and a resilient distortable outer member connected to said base and disposed outward therefrom, said gasket extending around a corner and at said corner having its base removed to provide a cutaway portion disposed between adjacent segments of the base which are located at the opposite sides of said corner, said outer member of the gasket being continuous across said cutaway portion at the corner, and a support for the gasket at said corner in the form of a resilient body received in said cutaway portion of the gasket between the adjacent segments of the base at the opposite sides of said corner, said body at its outer face defining a seat which receives and supports said outer member of the gasket at said corner.

6. In combination, an elongated gasket comprising a resilient base and a distortable bead connected to said base through a reduced neck and disposed outward from the base, said gasket extending around a 90° corner and at said corner having its base removed to provide a cutaway portion disposed between adjacent segments of the base which are located at the opposite sides of said corner, said bead on the gasket being continuous across said cutaway portion at said corner, and a support for the gasket at said corner in the form of a resilient body received in said cutaway portion of the gasket between the adjacent segments of the base at the opposite sides of said corner, said body at its outer face having an outwardly facing groove which curves around said corner and which receives and supports the bead on the gasket at said corner.

References Cited in the file of this patent

UNITED STATES PATENTS

| | | |
|---|---|---|
| 1,759,685 | Brucker | May 20, 1930 |
| 2,264,536 | Kuenzli | Dec. 2, 1941 |
| 2,620,520 | Kafer | Dec. 9, 1952 |
| 2,794,221 | Bedics | June 4, 1957 |